United States Patent
Duggleby

(10) Patent No.: US 12,071,914 B2
(45) Date of Patent: Aug. 27, 2024

(54) ROCKET ENGINE SYSTEMS WITH A SUPERCRITICAL COOLANT

(71) Applicant: Venus Aerospace Corp., Houston, TX (US)

(72) Inventor: Andrew Thomas Duggleby, Friendswood, TX (US)

(73) Assignee: Venus Aerospace Corp., Houston, TX (US)

( * ) Notice: Subject to any disclaimer, the term of this patent is extended or adjusted under 35 U.S.C. 154(b) by 0 days.

(21) Appl. No.: 17/561,621

(22) Filed: Dec. 23, 2021

(65) Prior Publication Data

US 2023/0220817 A1 Jul. 13, 2023

Related U.S. Application Data

(60) Provisional application No. 63/130,586, filed on Dec. 24, 2020.

(51) Int. Cl.
*F02K 9/64* (2006.01)
*F02K 9/46* (2006.01)

(52) U.S. Cl.
CPC .......... *F02K 9/64* (2013.01); *F02K 9/46* (2013.01); *F05D 2240/35* (2013.01); *F05D 2260/213* (2013.01); *F05D 2260/232* (2013.01)

(58) Field of Classification Search
CPC ..... F02K 9/00; F02K 9/46; F02K 9/60; F02K 9/62; F02K 9/64; F02K 9/66
See application file for complete search history.

(56) References Cited

U.S. PATENT DOCUMENTS

| | | | |
|---|---|---|---|
| 3,581,495 A | 6/1971 | Kah | |
| 3,588,298 A | 6/1971 | Edwards | |
| 3,611,722 A | 10/1971 | Shick | |
| 4,073,138 A * | 2/1978 | Beichel | F02K 9/48 60/245 |
| 4,097,820 A | 6/1978 | Hill et al. | |
| 4,220,001 A | 9/1980 | Beichel | |
| 6,185,927 B1 | 2/2001 | Chrones et al. | |
| 2003/0046923 A1* | 3/2003 | Dressler | F02K 9/52 60/258 |
| 2012/0060464 A1 | 3/2012 | Grote et al. | |
| 2017/0146244 A1* | 5/2017 | Kurosaka | F23R 3/10 |
| 2018/0038316 A1* | 2/2018 | Balepin | F02K 9/64 |
| 2018/0231256 A1 | 8/2018 | Pal et al. | |
| 2019/0003423 A1* | 1/2019 | Pelfrey | F02K 9/62 |
| 2020/0149743 A1 | 5/2020 | Singh et al. | |
| 2021/0108801 A1 | 4/2021 | Singh et al. | |
| 2022/0205412 A1 | 6/2022 | Duggleby | |

* cited by examiner

*Primary Examiner* — Scott J Walthour
(74) *Attorney, Agent, or Firm* — Osha Bergman Watanabe & Burton LLP

(57) ABSTRACT

A rocket engine system comprising a rocket engine, coolant and a coolant source, propellant and a propellant source, a turbopump, and a heat source. The coolant is pressurized and then heated through a heat source to a supercritical state for augmented heat transfer. The heat source may be a heat exchanger with returning coolant, or a preburner. The rocket engine system may further comprise at least one additional rocket engine with a pump to provide pressure for multiple engine. The rocket engine system may further comprise multiple turbopump shafts for independent control of propellants.

3 Claims, 4 Drawing Sheets

ROCKET ENGINE SYSTEMS WITH A SUPERCRITICAL COOLANT

CROSS-REFERENCE TO RELATED APPLICATIONS

This application claims priority to and the benefit of provisional patent application No. 63/130,586 filed 2020 Dec. 24 by the present inventor and non-provisional application Ser. No. 17/561,623.

FEDERALLY SPONSORED RESEARCH

Nonapplicable.

BACKGROUND

The present invention relates generally to rockets, rocket engines, and cooling systems relating to rocket pump motors and rocket engines. More specifically, the present invention relates to improved rocket engine systems with an independently-regulated cooling system.

The Applicant is unaware of inventions or patents, taken either singly or in combination, which are seen to describe the instant invention as claimed.

SUMMARY

The present invention relates to improved rocket engines with a supercritical coolant.

An improved rocket engine with a supercritical coolant comprises a coolant source, a propellant source, a pressurization system, and a heat exchanger. Each of the coolant source and propellant source is in operative communication with the pressurization system whereby the coolant is pressurized and then heated by a heat exchanger to a supercritical state.

In one embodiment, the propellant source comprises a fuel source, an oxidizer source which may be pre-mixed with the fuel source, and a coolant source, which coolant may be fuel, oxidizer, or inert.

One embodiment of the rocket engine comprises a cooling system with a coolant source, a fuel system with a fuel source, an oxidizer system with an oxidizer source, a propellant pressurizing system with a propellant pressurizing source, a heat exchanger, and the pressurization source driven by the coolant after it passes through the rocket engine and heat exchanger (expander cycle).

Another embodiment of the improved rocket engine system comprises a cooling system with a coolant source, a fuel system with a fuel source, an oxidizer system with an oxidizer source, a propellant pressurizing system with a propellant pressurizing source, a heat exchanger, a pressurization source driven by the coolant after it passes through the rocket engine and heat exchanger (expander cycle), and an aerospike nozzle which is cooled by the coolant after the it has powered the pressurization system.

A further embodiment of the improved rocket engine system comprises a cooling system with a coolant source, a fuel system with a fuel source, an oxidizer system with an oxidizer source, a propellant pressurizing system with a propellant pressurizing source, a preburner, and a pressurization source driven by the coolant after it passes through the rocket engine and heat exchanger (expander cycle). The preburner is a side combustion reaction between the fuel and oxidizer to generate supercritical coolant.

BRIEF DESCRIPTION OF THE FIGURES

These and other characteristics of the present invention will be more fully understood by reference to the following detailed description in conjunction with the attached drawings, in which.

DETAILED DESCRIPTION

Referring to FIGS. 1-4, the present invention is an improved rocket engine with a supercritical coolant. A person or ordinary skill in the art understands that the flow circuit shown in FIGS. 1-4 is simplified so as not to obscure the invention with unnecessary detail. There are also a number of valves, ancillary lines, and by-pass pathways, not shown.

Figure 1:
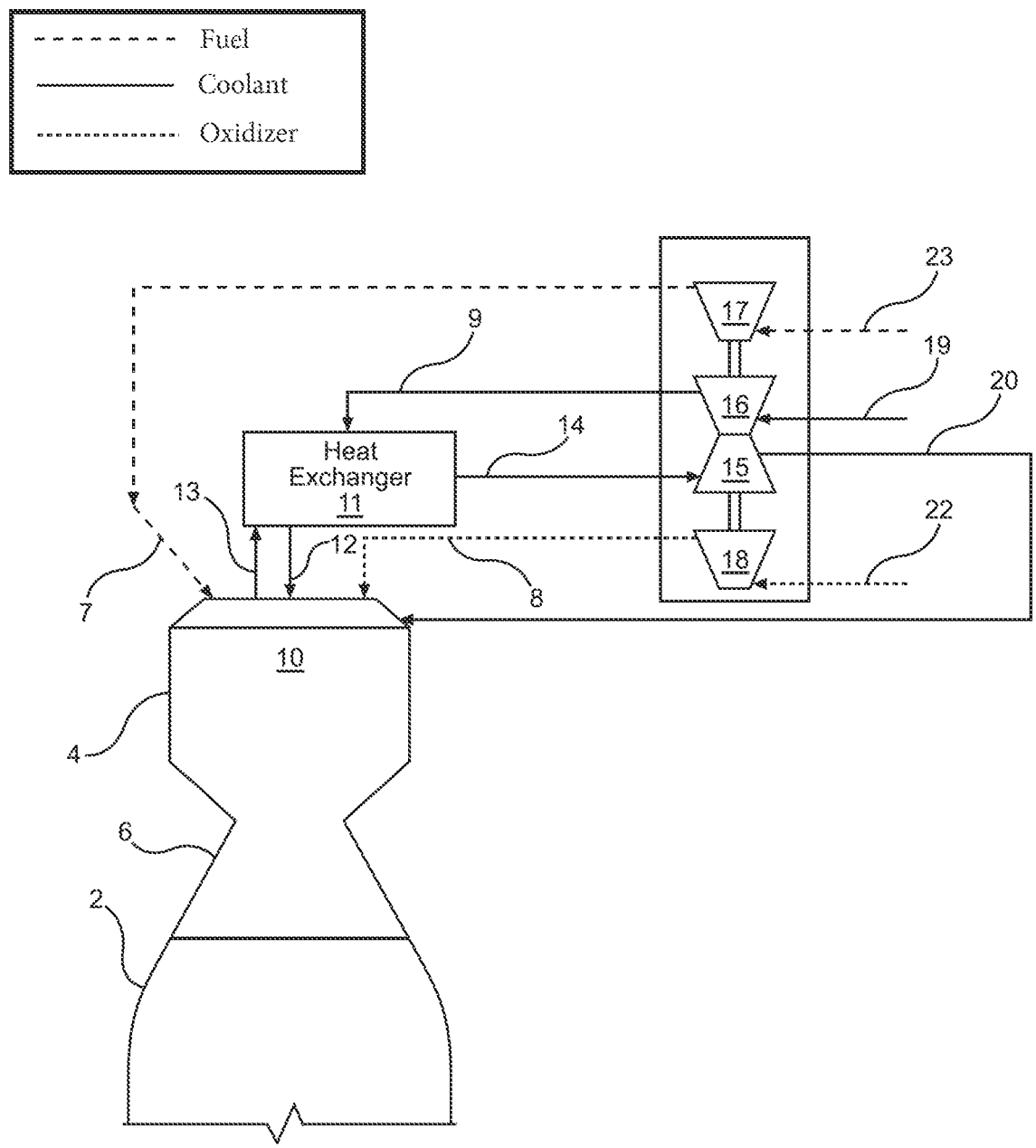
FIG. 1 is a detailed schematic view of a first embodiment of an improved rocket engine system with a supercritical coolant according to the present invention, showing a coolant source, fuel source, oxidizer source, pressurization system, heat exchanger, and rocket engine.

Referring to FIG. 1, the rocket engine uses propellant that includes a fuel source stored in the vehicle and delivered to the engine via the fuel feedline 23, an oxidizer source stored in the vehicle and delivered to the engine via the oxidizer feedline 22, and a coolant source stored in the vehicle and delivered to the engine via the coolant feedline 19 which is in communication with a pressurization system consisting of a turbine 15, coolant pump 16, fuel pump 17, and oxidizer pump 18. The coolant pump 16 is in communication with a heat exchanger 11 via a high-pressure coolant line 9. The fuel pump 17 is in communication with the injector manifold 10 through a fuel high-pressure fuel line 7. The oxidizer pump 18 is in communication with the injector manifold 10 through a high-pressure oxidizer line 8.

The coolant temperature is increased in the heat exchanger 11 to a supercritical state and the supercritical coolant is then in communication with coolant channels, also called cowls, built into the outer walls via the coolant heat exchanger outlet line 12. In one embodiment, the supercritical state is temperature and pressure just into the supercritical regime of the coolant used. For example, if water is used as the supercritical coolant, the temperature may be raised to between 374-392° C., and the pressure to between 220-231 bar. The coolant may thus be raised to a just-supercritical state, just above the critical pressure and temperature, where there is a significant increase in convective heat transfer due to the lower viscosity and higher conductivity of the fluid. The internal coolant channels are integrated into the wall via manifolds and passages as those skilled in the art are familiar with. The coolant cools the engine walls including the throat 6 and portion of the nozzle 2 before returning to the heat exchanger 11 via the hot coolant inlet 13. The coolant after exchanging heat with the incoming coolant, exits the heat exchanger 11 and enters the coolant turbine 15 via the hot coolant heat exchanger outlet 14. After the coolant provides the power for the pressurization system, the coolant enters the injector manifold 10 via the turbine outlet line 20, and enters the combustion chamber 3 with the fuel and propellant and exits the rocket engine through the throat 6.

Figure 2:
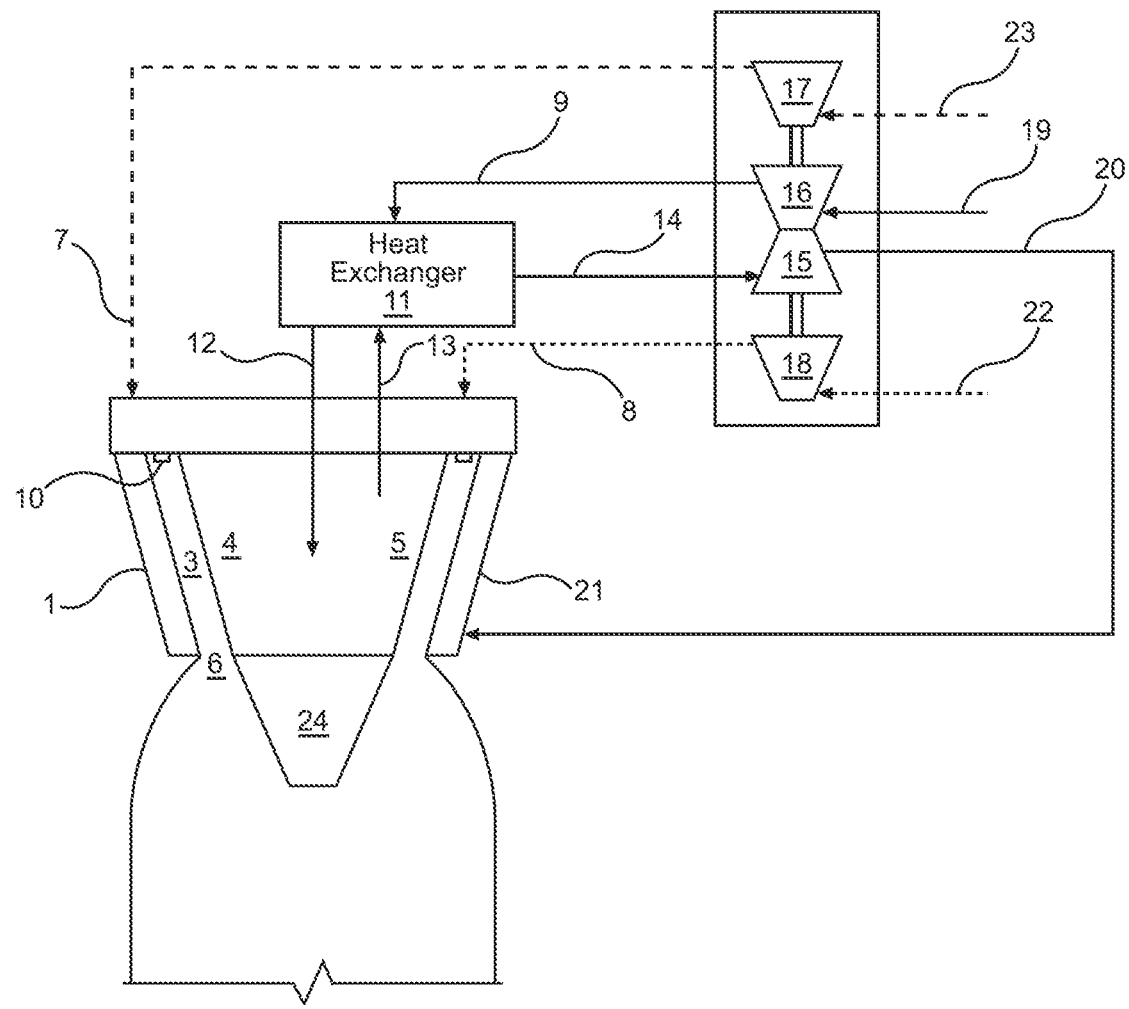
FIG. 2 is a detailed schematic view of a second embodiment of an improved rocket engine system with a supercritical coolant according to the present invention, showing a coolant source, fuel source, oxidizer source, pressurization system, heat exchanger, and rocket engine with an aerospike nozzle.

Referring to FIG. 2, the rocket engine includes an aerospike nozzle 24 such that the combustion happens in an annulus 3 contained by an inner cowl or channel 5 and outer cowl 1. An aerospike nozzle may also be any altitude-compensating nozzle, for example a plug nozzle, expanding nozzle, single expansion ramp nozzle, stepped nozzle, expansion deflection nozzle, or extending nozzle. In one embodiment where the rocket engine with aerospike nozzle is a rotating detonation rocket engine and there is an increased yet localized heat load near the injection point, the coolant is brought to a near-supercritical state at the same location to augment cooling.

In this embodiment there are coolant channels 4 in the inner cowl 5 and coolant channels 21 in the outer cowl 1. Coolant from the heat exchanger outlet 12 first cools the inner cowl 5 via coolant channels 4 before returning to the heat exchanger 11 via the hot coolant heat exchanger inlet 13. The hot coolant after exchanging heat with the incoming coolant, exits the heat exchanger 11 and enters the coolant turbine 15 via the hot coolant heat exchanger outlet 14. After the coolant turbine 15 the coolant returns to the aerospike engine and cools the outer cowl 1 via coolant channels 21. The coolant channels 4 and 21 are integrated into the cowls via manifolds and passages as those skilled in the art are familiar with. After the coolant provides the power for the pressurization system, the coolant enters the injector manifold 10 via the turbine outlet line 20, and enters the combustion chamber annulus 3 with the fuel and propellant and exits the rocket engine through the throat 6.

Figure 3:
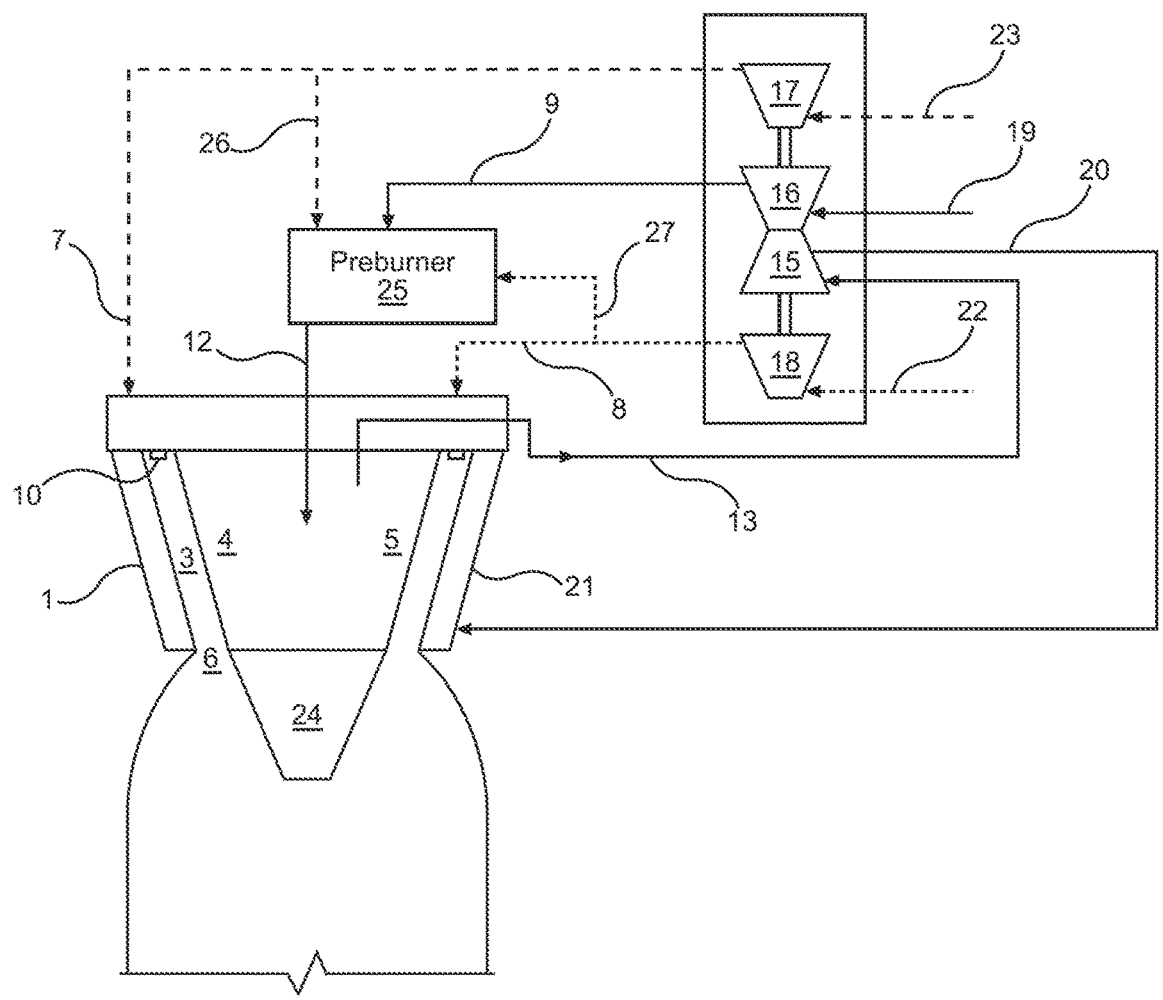
FIG. 3 is a detailed schematic view of a third embodiment of an improved rocket engine system with a supercritical coolant according to the present invention, showing a coolant source, fuel source, oxidizer source, pressurization system, preburner, and rocket engine with an aerospike.

Referring to FIG. 3, the rocket engine uses a preburner 25 to add heat to the coolant, completely or temporarily, for example just for startup, replacing or contributing to a heat exchanger. A small amount of fuel is diverted to the preburner from the high-pressure fuel line 7 via the fuel preburner inlet 26, and a small amount of oxidizer is diverted to the preburner from the high-pressure oxidizer line 8 via the oxidizer preburner inlet 27.

Figure 4:
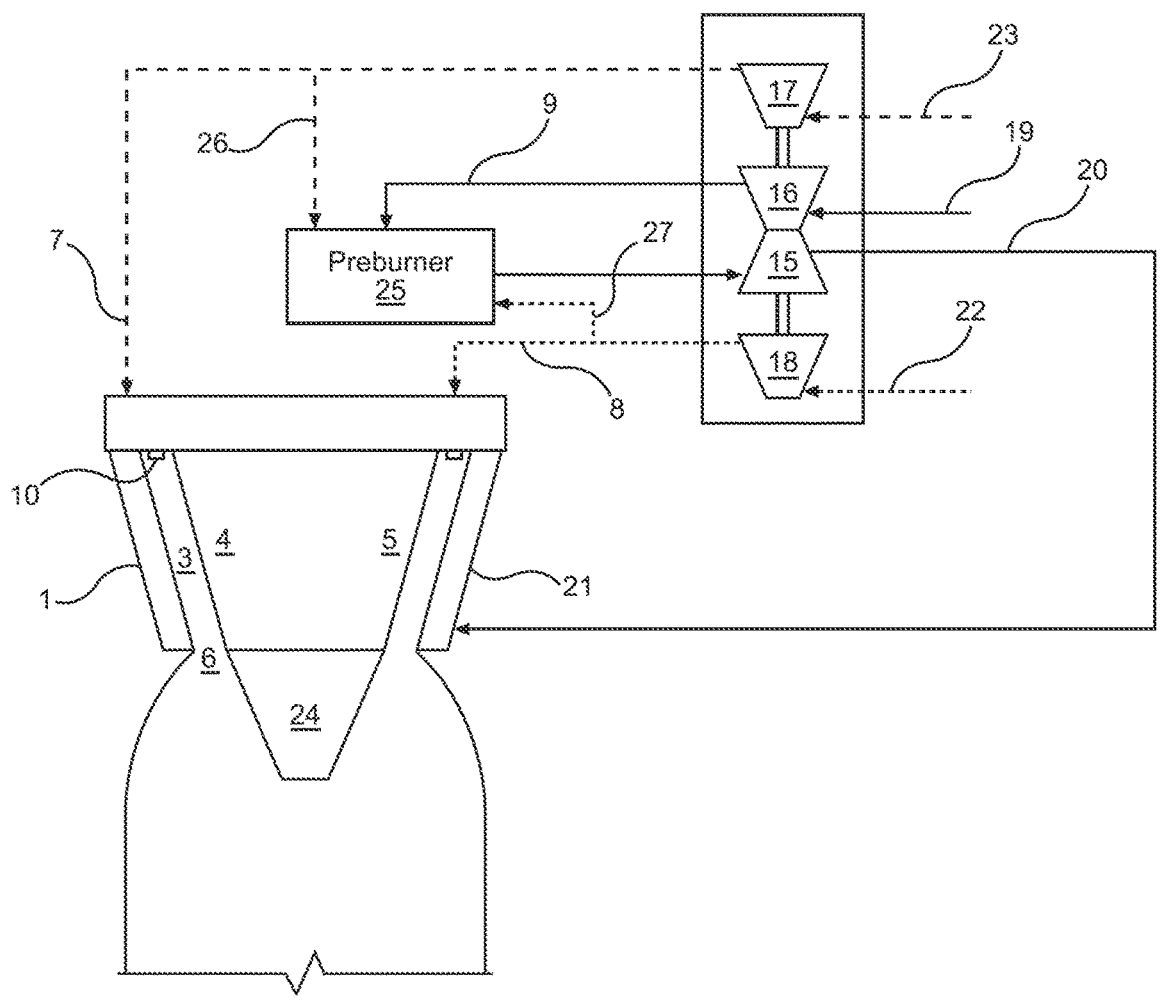
FIG. 4 is a detailed schematic view of a fourth embodiment of an improved rocket engine system with a supercritical coolant according to the present invention, showing a coolant source, fuel source, oxidizer source, pressurization system, preburner in alternate configuration, and rocket engine with an aerospike.

Referring to FIG. 4, the rocket engine uses a preburner 25 that powers the pressurization system and then is mixed with the rest of the coolant in the preburner 25 before powering the turbopump 15 via the turbine inlet line 28 before cooling the rocket engine via the engine coolant line 20. Coolant is fed from the coolant pump 16 through line 9 to the preburner 25.

Element 30 in drawings is a rocket engine embodiment.
Element 31 in drawings is a block of hardware that includes plumbing as necessary, as is known in the art.

EQUIVALENTS

"Rocket engine" and "rocket engine system" are generally equivalent terms.

"Cowl" and "wall" of a combustion chamber are generally equivalent terms.

"Fuel source," "oxidizer source," and "coolant source" are generally equivalent terms with "fuel input," "oxidizer input," and "coolant input" respectively. These sources/inputs may be described as "feedlines."

"Passages," "channels" and "cowls" are generally equivalent terms.

"Turbopump" and "turbine" are generally equivalent terms.

CONCLUSION, RAMIFICATIONS, AND SCOPE

The convection heat flux, $q=h\Delta T$, into the coolant is proportional to the convection coefficient h and temperature difference $\Delta T = T_{combustion} - T_{coolant}$. In a supercritical state, the convection coefficient h increases significantly due to decreased viscosity and increased thermal conductivity of the coolant. The total heat transfer increases, even though the coolant temperature $T_{coolant}$ has increased giving a subsequent decrease in $\Delta T$. Thus the rocket engine can be cooled much more effectively and efficiently.

What is claimed is:

1. A rotating detonation rocket engine comprising:
    an aerospike nozzle and an injection point, said rotating detonation rocket engine having a localized increased heat load at a location proximate said injection point;
    a thrust chamber within said rotating detonation rocket engine, said thrust chamber including walls that define a combustion section which is fluidically coupled to an output section, the walls including a first one or more cooling channels therein;
    a coolant source containing a coolant;
    a pressurization system coupled with said coolant source, said pressurization system configured to pressurize said coolant to a pressure that is within 10% of a lowest pressure at which said coolant reaches a supercritical state to form a pressurized coolant;
    said pressurization system comprising:
        a turbine;
        a coolant pump;
        a fuel pump; and
        an oxidizer pump;
    a heat exchanger fluidically coupled with said coolant pump via a high-pressure coolant line, said heat exchanger configured to receive said pressurized coolant via said high-pressure coolant line, wherein said pressurized coolant is received at said heat exchanger with said coolant at said pressure that is within said 10% of said lowest pressure at which said coolant reaches said supercritical state, said heat exchanger configured to heat said pressurized coolant to a temperature that is within 10% of a lowest temperature at which said coolant reaches said supercritical state to form a heated pressurized coolant, said heated pressurized coolant utilized to cool said rotating detonation rocket engine, said coolant also fluidically coupled to said injection point of said rotating detonation rocket engine, at which said localized increased heat load is present, to enhance cooling of said rotating detonation rocket engine; and
    wherein said heat exchanger is fluidically coupled to the first one or more cooling channels to provide said heated pressurized coolant to the first one or more cooling channels.

2. The rotating detonation rocket engine of claim 1, wherein the thrust chamber contains an inner wall that defines the combustion section as an annulus, the inner wall including a second one or more cooling channels therein;
    wherein the heat exchanger is further fluidically coupled to the second one or more cooling channels.

3. The rotating detonation rocket engine of claim 1, wherein the first one or more cooling channels are fluidically coupled to the thrust chamber.

\* \* \* \* \*